United States Patent [19]

Nash

[11] Patent Number: 4,611,570
[45] Date of Patent: Sep. 16, 1986

[54] CAPACITIVE DISCHARGE MAGNETO IGNITION SYSTEM

[75] Inventor: Donald R. Nash, Berkey, Ohio

[73] Assignee: Allied Corporation, Morris Township, Morris County, N.J.

[21] Appl. No.: 728,919

[22] Filed: Apr. 30, 1985

[51] Int. Cl.$^4$ ............................................. F02P 5/145
[52] U.S. Cl. .............................. 123/601; 123/149 C; 123/602
[58] Field of Search ............... 123/599, 601, 602, 603, 123/418

[56] References Cited

U.S. PATENT DOCUMENTS

| | | |
|---|---|---|
| Re. 27,704 | 7/1973 | Carmichael et al. ............... 123/599 |
| Re. 31,230 | 5/1983 | Swift et al. ..................... 123/601 X |
| 3,484,677 | 12/1969 | Piteo ..................................... 322/91 |
| 3,824,976 | 7/1974 | Katsumata et al. .................. 123/603 |
| 3,853,107 | 12/1974 | Sieja . | 
| 3,948,239 | 4/1976 | Katsumata ........................... 123/149 |
| 4,036,201 | 7/1977 | Burson . |
| 4,157,702 | 6/1979 | Ogasawala et al. ................. 123/149 |
| 4,163,437 | 8/1979 | Notaras et al. . |
| 4,202,305 | 5/1980 | Wolf . |
| 4,211,195 | 7/1980 | Zechlin ........................... 123/602 X |
| 4,270,509 | 6/1981 | Tharman .............................. 123/647 |
| 4,273,093 | 6/1981 | Ozawa ............................. 123/602 X |
| 4,324,215 | 4/1982 | Sieja ..................................... 123/335 |
| 4,351,286 | 9/1982 | Aylott ................................. 123/601 |
| 4,401,096 | 8/1983 | Podrapsky .......................... 123/631 |
| 4,402,298 | 9/1983 | Morita ................................. 123/599 |
| 4,404,940 | 9/1983 | Sieja ..................................... 123/335 |
| 4,404,952 | 9/1983 | Fujimoto et al. ................... 123/602 |
| 4,509,493 | 4/1985 | Nash ..................................... 123/602 |

Primary Examiner—Tony M. Argenbright
Attorney, Agent, or Firm—Markell Seitzman; Russel C. Wells

[57] ABSTRACT

A capacitive discharge magneto ignition system comprising a magneto (10) for generating an ignition spark through a plurality of ignition coils (66,68). The magneto (10) supports a plurality of coils (40,42) on its center pole (20) or leg and a separate pulse suppression coil (46) situated between two of its poles (20,22) or legs. The system includes control circuitry (200) interposing the magneto (10) and ignition coils (66,68) for varying ignition spark timing (206), limiting the maximum speed of engine rotation (208) and for preventing reverse engine rotation.

34 Claims, 7 Drawing Figures

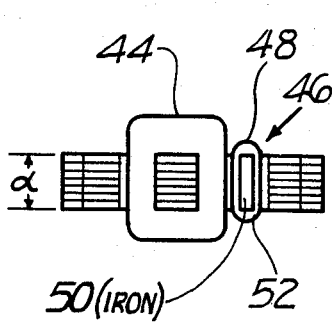
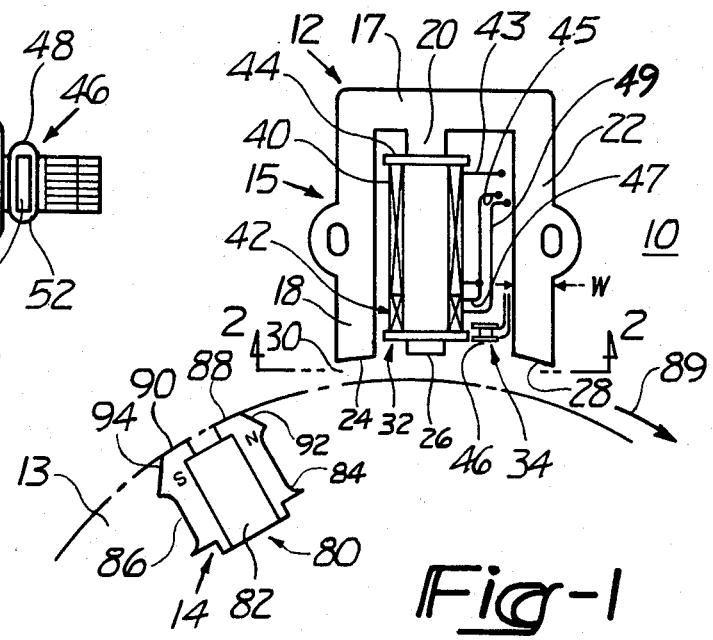
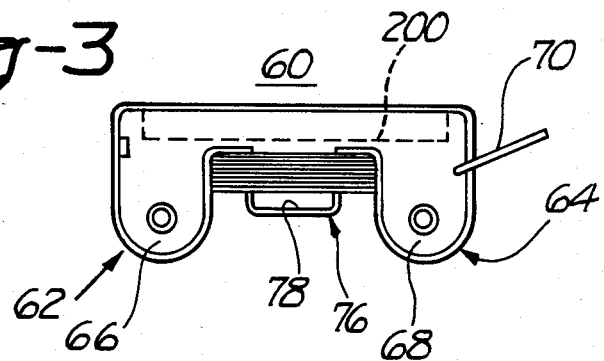
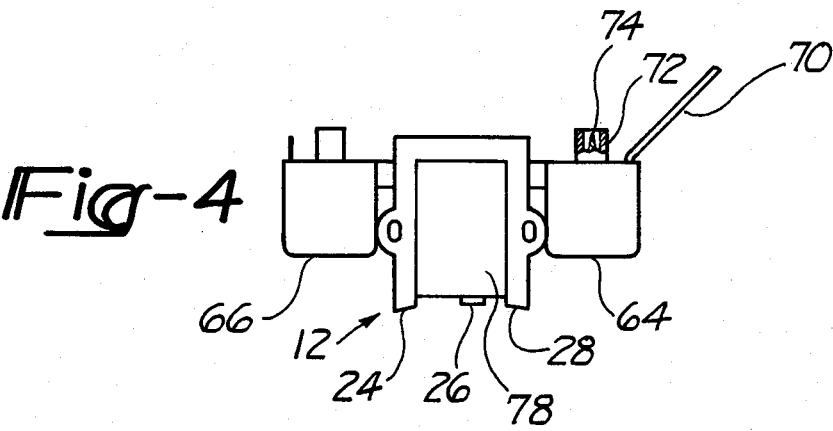

CAPACITIVE DISCHARGE MAGNETO IGNITION SYSTEM

BACKGROUND AND SUMMARY OF THE INVENTION

The present invention relates to a magneto ignition system and more particularly to an improved magneto and associated electronic circuitry which provides ignition advance and retard spark timing, engine speed limiting, and reverse engine rotation protection.

The ignition system as well as the magneto of this invention is particularly useful with small engines of the type commonly used in chain saws, snow blowers, portable power generators, lawn mowers and the like. While the preferred embodiment of the invention is described for use with a two cylinder engine, this is not a limitation of the invention in that the invention may be extended to a multi-cylinder engines by incorporation of a distributor of a known type or use a plurality of magnetos with each of the cylinders.

There are many existing ways of accomplishing ignition timing for both large and small internal combustion engines. Conventional ignition systems comprise a pair of hard metal breaker points which are activated by a rotor which is rotated in synchronism with the engine cycle. This system is inefficient in that the breaker points have limited lifetime and need to be replaced at regular intervals because of their rapid deterioration. Such systems have been replaced by magneto, capacitive discharge ignition systems comprising a rotor which produces a varying magnetic field in a closely spaced pickup coil.

Some prior magneto capacitive discharge ignition systems which change the ignition timing do so by some mechnical means or they effect a change in timing in response to the amplitude of an electrical signal. This generally results in a system that requires calibration. Typically, the change in ignition timing is gradual over the speed of the engine. This application is intended for application requiring a step change in ignition timing at a precise speed. Systems requiring calibration upon manufacture, result in some labor costs and the possibility of calibration change when in use. This invention removes the need for calibration upon manufacture and any susceptibility to change in calibration when installed on an engine.

The present invention accomplishes the functions of ignition advance and retard spark timing, engine speed limiting and reverse engine rotation protection utilizing a uniquely constructed magneto that generates a walking or variable phase waveform in cooperation with a novel circuit.

Accordingly, the present invention comprises an improvement in such magneto capacitive discharge ignition systems and comprises:

A capacitive discharge magneto ignition system comprising at least one ignition coil comprising a primary winding and a secondary winding; and a magneto. The magneto includes a stator and a rotor that is rotated synchronously with the engine for inducing voltages into a plurality of windings supported by the stator. The magneto further includes means for generating a first induced voltage; and means for generating a second induced voltage having a phase which varies relative to the first induced voltage in proportion to the speed of the engine. More particularly the magneto may include: first means for generating a first induced voltage signal characterized by a first portion or first trigger pulse of a first polarity followed by a second portion of opposite polarity and a third portion or second trigger pulse of the first polarity and second means for generating a second induced voltage signal characterized by a first portion or first trigger pulse of the first polarity followed by a second portion of the opposite and a third portion or second trigger pulse having a phase which varies relative to the second trigger pulse to the first induced voltage signal in proportion to the speed of the engine, and third means for generating a third induced voltage signal of polarity opposite to the polarity of said first induced voltage signal. The system further includes: a circuit connecting the magneto to the ignition coil for generating a spark in response to the induced voltages; and includes a charge capacitor charged by the third means during periods when the third induced voltage signal is of the first polarity and timing means responsive to the first and second trigger pulses from the first means and the second means for advancing the timing of discharging of the capacitor through the ignition coil to provide an ignition spark.

The system further includes means responsive to the trigger pulses generated by the first means, referred to above, for inhibiting the third means for charging the charge capacitor when the engine is rotating at or near a maximum desirable speed. This action thereby effectively limiting the engine speed to such maximum desirable level.

It is the object of the present invention to automatically advance the ignition spark at or above nominal engine speed. Such spark advance timing is needed since it may be desirable to increase the available power from the engine. A further object of the invention is to provide an improved magneto comprising a pickup and a rotor which together produce a plurality of trigger pulses which may be used to automatically advance the ignition timing as well as to provide engine overspeed and reverse engine rotation protection in cooperation with the control circuitry disclosed below. A further object of the present invention is to provide an ignition system which does not require calibration during assembly. An additional object of the present invention is to automatically control the ignition retard timing below a certain nominal engine speed to allow for easy starting of the engine.

Many other objects, advantages and purposes of the invention will be clear from the detailed description of the drawings.

BRIEF DESCRIPTION OF THE DRAWINGS

In the Drawings:

FIG. 1 illustrates a schematic representation of the stator and rotor of the present invention.

FIG. 2 illustrates a plan end view of the stator of FIG. 1.

FIG. 3 illustrates a top view of a housing.

FIG. 4 illustrates a side plan view of the housing.

DETAILED DESCRIPTION OF THE DRAWING

Figure 5:
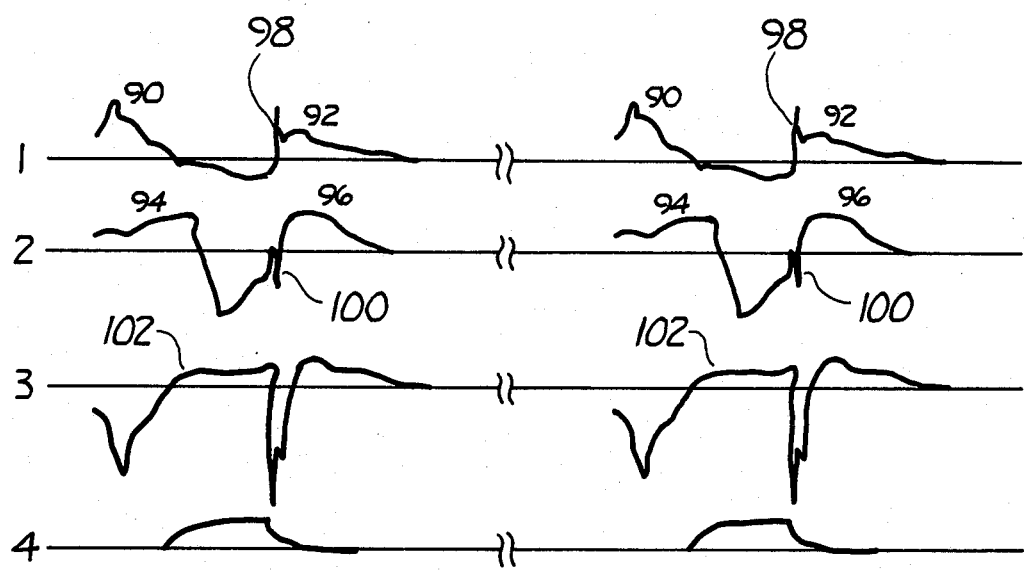
FIG. 5 illustrates various waveforms generated by the system during nominal engine speeds.

With reference to the accompanying drawings and in particular FIG. 1, there is illustrated a magneto 10 comprising a stator 12 and a rotor 14 such relationship is shown schematically. As is known in the art, the stator 12 is mounted apart from the rotor which may be formed or positioned on the engine flywheel 13 or similar rotating engine component. The stator 12 comprises an E-type pickup comprising a core 15 including a crossbar 17 supporting three spaced poles 18, 20 and 22 of width, w and depth, d formed by a plurality of laminations secured together by known means. Each pole terminates at an arcuately shaped end face 24, 26, 28, respectively. The curve of the arcuate end faces 24–28 conforms to the radial path of the rotor 14. The end faces 24–28 are position apart from the rotor 14 by an air gap 30. In the preferred embodiment of the invention the spacing between the pole pieces 18, 20, 22 is asymmetrical, however, this is not believed to be a requirement thereof. More particularly, when viewed in relationship to the direction of rotation of the rotor 14 a first pole pair comprising poles such as 18 and 20 defining a smaller or narrow spacing 32 is encountered first. The poles 20 and 22 respectively define a larger spacing 34. In the preferred embodiment of the invention the width, w, of each pole 18–22 is approximately equal. In addition the narrow pole spacing 32 is approximately equal to the pole width. The wider pole spacing 34, between poles 20 and 22, is approximately twice the narrow spacing 32. In the preferred embodiment of the invention the pole width is approximately 0.3 inches (7.62 mm) and depth is approximately 0.5 inches (12.7 mm).

The center pole 20 carries a plurality of windings or coils. There is situated apart from the end face 26 a first, larger turn, charge winding or coil 40. Such winding 40 terminates at wires 43 and 45. Positioned on the pole 20 closer to the end face 26 is a second smaller turn, trigger coil or winding 42. Such windings 40 and 42 are wound about the pole 20 such that voltages of opposite polarities are induced therein. The trigger winding 46 terminates at a wires 47 and 49. Wire 47 is connected in common to the conductor or wire 44 of coil 40. It should be appreciated that the wires 43, 45, 47 and 49 are diagramatically illustrated. The reverse polarity of the windings 40 and 46 are shown by the conventional "dot" notation in the circuit diagram of FIG. 6. For convenience and ease of manufacture and assembly, the windings 40 and 42 are wound about a plastic bobbin 44 which is received about the pole 20 and during manufacture secured in place by a potting compound or the like.

Positioned within the larger spacing 34 between poles 20 and 22 is a suppression winding or coil generally designated as 46. This suppression coil 46 as shown in FIG. 2 comprises an iron core inductance comprising a plastic bobbin 48 which includes a substantially oblong center 52 into which an iron core 50 is received and about which the suppression winding 46 is wound. The length of the iron core 50 is approximately equal to the depth of the pole pieces as illustrated in FIG. 2. The bobbin 48 is oriented such that its major axis is parallel to the depth of pole 20 and is positioned near the second or trigger coil 42 as more particularly illustrated in FIG. 2.

The system 10 further includes a housing generally shown as 60 which supports the E-shaped stator 12 and its associated circuitry 200 in a compact unit as illustrated in FIGS. 3 and 4. The housing 60 includes a plurality of end portions 62 and 64 which support first and second ignition coils 66 and 68 respectively remote from the stator 12. The circuitry 200, shown in phantom lines is also supported within the housing 60. The invention is intended for use with multiple cylinder engines where simultaneous provision for ignition pulses to more than one cylinder is effective to cause combustion therein. The number of coils used is a matter of choice as is the incorporation of a distributor. Each of the ignition coils 66 and 68 may be wound about a suitable carrier, bobbin or core (not shown) and includes a primary (210, 212) and a secondary winding (224, 226) shown in FIG. 6. The connection of the windings of the ignition coils to the circuit 200 of the present invention is more particularly illustrated in FIG. 6. The grounded ends of the primary and secondary coils are connected to a ground strap 70 which is secured to the engine frame. Each of the ignition coils 66, 68 respectively includes a suitable core provided with a socket 72 for receiving an end of a spark plug wire (not shown). A connector 74 is located within each socket 72 and is connected to one end of its corresponding secondary coil for connection to the spark plug wire.

The housing 60 further includes a central projecting portion 76 defining a rectangular bracket 78 which supports the inner surfaces of the poles 18, 22 of the stator 12 and through which is received pole 20, bobbins 44, 48 and the associated coils 40, 42, 46. The housing 60 is secured to the engine by suitable means such that the pole ends 24–28 are positioned apart from the rotor 14.

Reference is again made to FIG. 1 which further illustrates the rotor 14 which is moved by the engine in synchronism with the combustion process. The rotor 14 as previously mentioned may be attached to the engine flywheel 13 which is movable with the engine crank shaft. The rotor comprises a permanent magnetic device generally illustrated as 80 which generates a varying magnetic flux field in the stator 14. As illustrated in FIG. 1, the permanent magnet device 80 comprises a rectangular magnet 82 separating two pole pieces 84 and 86. The pole pieces 84 and 86 terminate in arcuately shaped end faces 88 and 90. The outward ends 92, 94 of the end faces 84 and 86 are notched to concentrate the magnetic flux therethrough. In the preferred embodiment of the invention the magnet is fabricated of ceramic or rare earth materials. The length across the end faces is slightly greater than the width of the poles 18–22. As an example, the lengths of the end faces may be approximately 0.35 inches (8.8 mm) and the spacing across the magnet 82 approximately 0.5 inches (12.7 mm). The magnet 82 may be poled such that its north pole is oppositely positioned relative to its south pole as viewed along the direction of rotation of the rotor 14. In addition, in the illustrated embodiment of the invention the permanent magnet device 80 is constructed such that the north pole of magnet 82 first interacts with the stator 12 as the rotor 14 is rotated in the direction shown by the solid arrow 89.

Figure 7:
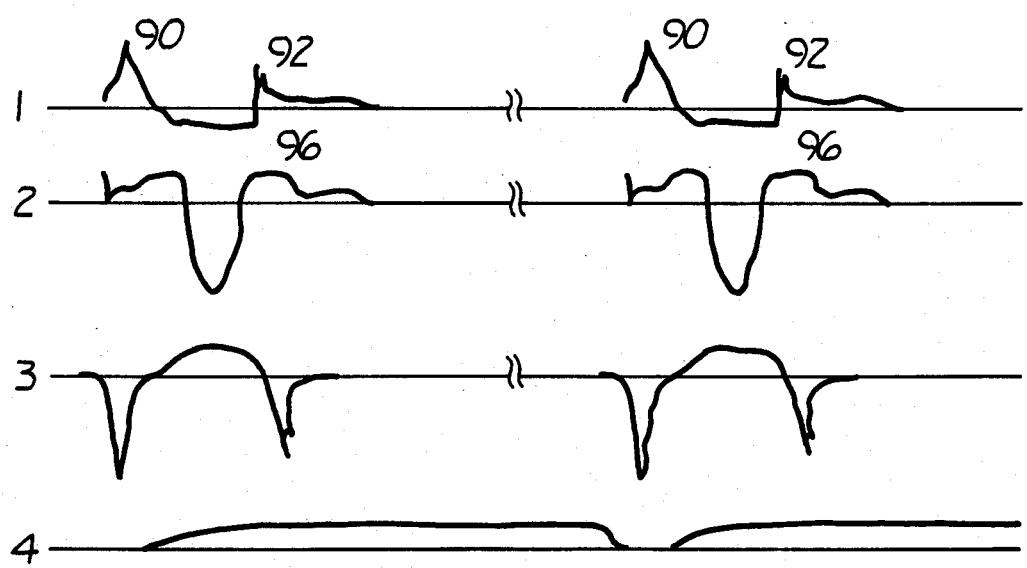
FIG. 7 illustrates the time histories of various waveforms generated by the system at speeds greater than those illustrated in FIG. 5.

Reference is now made to FIG. 5. The waveforms illustrated on FIG. 5 represent various voltages typically generated by the system during nominal speed operation. The waveforms illustrated on lines 1 and 2 represent the voltages induced by the permanent magnet device 80 in the trigger winding 42 and the suppression winding 46, respectively. The waveform shown on line 3 of FIG. 5 illustrates the induced voltage in the charge winding 40 which differs in magnitude from the voltage generated by coil 42 because of the number of turns and, which because of the reverse polarity of the coils 40 and 42, is the inverted counter-part of the wave induced in the trigger winding 42. The waveform shown on line 4 represents the charge on a charge capacitor 216 which is discussed in greater detail below. The waveforms of FIG. 5 and also of FIG. 7 are not drawn to scale. Typically, the maximum output voltage generated by the trigger coil 42 and the suppression coil 46 are approximately ten and six volts, respectively. The output of the charge coil 40 and charge on the charge capacitor 218 are approximately 200–300 volts.

The characteristic signature of the waveforms generated by the respective coils as the permanent magnetic device 80 passes the stator 12 comprises two positive peaks or trigger pulses generally separated by a portion of opposite polarity. The trigger pulses from coil 42 designated as 90, 92 and are shown on FIG. 5, line 1. The trigger pulses from coil 46 are generally designated as 94 and 96 and are shown on FIG. 5, line 2. As would be expected because of the physical displacement of the third coil or suppression winding 46 from the second coil or trigger 42 the first and second positive trigger pulses 90, 92 of waveform of lines 1 occur prior in time relative to the respective trigger pulses 94, 96 of the waveform on line 2. As will be seen from the discussion below, because of the novel features of the magneto 10 of the present invention the occurrence of the second trigger pulse 96 from the suppression coil 46 will not always lag behind the second trigger pulse 92 of the trigger coil 42. The transient spikes generally designated as 98 and 100 in the wavforms illustrate noise induced into the windings by the firing of the spark plugs. The waveforms described above will repeat each time the rotor 14 passes the stator 12 as shown.

Figure 6:
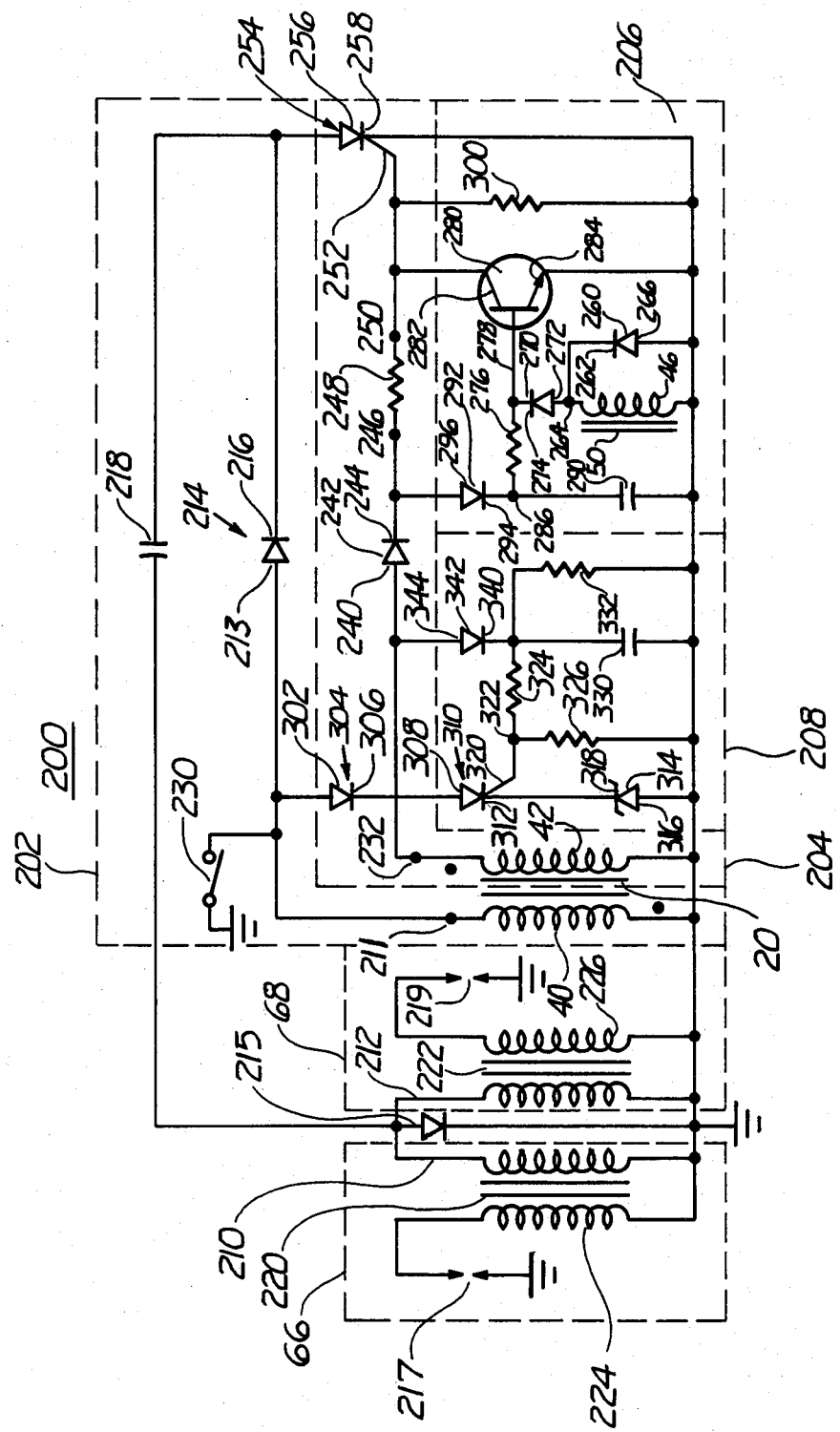
FIG. 6 illustrates the control circuitry utilized by the present invention.

Reference is now made to FIG. 6 which illustrates the control circuit 200 which is used in conjunction with the magneto 10 of the present invention. As previously mentioned, the present invention permits the performing of various engine related functions such as: advance and retard spark timing in conjunction with the ability to charge and discharge a charge capacitor to provide the necessary spark for the spark plugs of the engine, engine speed limiting and reverse engine rotation protection.

The circuitry responsible for accomplishing the above functions is generally shown by the dotted lines of FIG. 6. More specifically, numeral 202 illustrates those circuit components utilized for charging capacitor 218 while numeral 204 shows those components utilized to discharge the capacitor. Numeral 206 identifies those circuit components which accomplish the advance and retard timing functions while numeral 208 identifies those components which perform the speed limiting function. It should be recognized by those skilled in the art that in order to accomplish the various functions of the present invention in an efficient manner some of the components are utilized to accomplish more than one function. As an example, the function of reverse engine protection is accomplished by the timing circuitry 206.

The charging portion 202 of the circuit 200 comprises the first or charge coil, 40 wound about the center pole 20, having its non-grounded terminal 211 connected to the anode 213 of a diode 214. The cathode 216 of the diode 214 is connected to a charge capacitor generally designated 218. The capacitor is connected to the ignition coils 66, 68. More specifically, the capacitor 218 is connected to the primary windings 210, 212 of the respective ignition coils 66, 68 and to the anode of a diode 215. The diode 215 is connected in parallel with the primary coils 210, 212 to ground and aids in the rapid collapse of the magnetic field to produce the spark at the spark plugs 217, 219. Each of ignition coils 66, 68 comprises a ferromagnetic core 220, 222 respectively about which the primary coils 210, 212 and their corresponding secondary coils 224, 226 are wound. One end of each of the secondary coils 224, 226 is communicated to one of the spark plugs 217, 219, respectively. While the other end of these secondary coils 224, 226 is connected in common to ground with the other ends of the coils 40, 42, 46, 210, and 212. A switch generally designated as 230 is connected to the terminal 211 of the first or charge coil 40 which when closed by the operator of the engine short circuits the coil 40 to ground thereby turning off the engine.

As can be seen in conjunction with the waveforms of FIG. 5, the capacitor 218 is charged (see line 4) during the positive going portion 102 of the waveform on line 3.

The portion 204 of circuit 200 comprises means for discharging the capacitor 218 to produce the spark and comprises the second or trigger coil 42 which is wound about the center pole 20. It should be noted that the dot notation shown on coils 40 and 42 illustrates the polarity of the voltages induced therein. The non-grounded terminal 232 of the trigger coil 42 is connected to the anode 240 of a diode 242 which has its cathode 244 connected to the first terminal 246 of a resistor 248. The second terminal 250 of the resistor 248 is connected to a semiconductor switch such as to the gate 252 of a silicon controlled rectifier (SCR) generally designated as 254. The anode 256 of the SCR 254 is connected to the cathode 216 of the diode 214 and the cathode 258 of the SCR is connected to ground.

The spark suppression or advance timing circuitry 206 comprises the third or suppression coil 46 which as illustrated wound about its ferromagnetic core 50. A diode 260 is connected in parallel with the coil 46. More specifically, the anode 262 of the diode 260 is connected to the non-grounded terminal 264 of coil 46. The cathode 266 of the diode 260 is connected to ground. The coil terminal 264 is connected to the anode 272 of diode 270 which has its cathode 274 connected to the junction of resistor 276 and another switch such as the base 278 of the n-p-n transistor 280. The collector 282 of the transistor 280 is connected to the second terminal 250 of the resistor 248 while its emitter 284 is connected to ground. The other end 286 of the resistor 276 is connected to ground through the capacitor 290 and to the junction of the diode 240 and resistor 248 through another diode 292. More specifically the cathode 294 of the diode 292 is connected to the terminal 286 of the resistor 276 and its anode 296 is connected to the terminal 246 of the resistor 248. Another resistor 300 is connected between the gate 252 of the SCR 254 to ground.

The speed limiting function 208 is accomplished in concert with the coils 40 and 42. More specifically, the non-grounded terminal 211 of coil 40 is connected to the anode 302 of diode 304 which has its cathode 306 connected to another semiconductor switch such as to the anode 308 of another SCR 310. The cathode 312 of the SCR 310 is connected to ground through a Zener diode 314. The Zener diode is connected such that its anode 316 is grounded and its cathode 318 is connected to the cathode 312 of the SCR 310. The gate 320 of the SCR 310 is connected to the common terminal 322 of resistors 324 and 326. The other terminal of resistor 326 is grounded. The other terminal of resistor 324 is connected to ground through a capicitor 330. An additional resistor 332 is connected in parallel with the capacitor 330. In addition, the other terminal of resistor 324 is connected to the cathode 340 of diode 342 which has its anode 344 connected in common to terminal 232 of coil 42 and to the anode 240 of the diode 242.

The operation of the system 10 is best understood in conjunction with the circuit 200 of FIG. 6 and the waveforms of FIGS. 5 and 7.

As will be recalled from the discussion above, the waveforms illustrated in FIG. 5 illustrate the engine operating at a nominal speed. Characteristic of the waveforms generated by the trigger coil 42 and the suppression coil 46 are the two positive going trigger pulses 90, 92 and 94, 96, respectively. During engine retard timing the second trigger pulse 92 of coil 42 is used to discharge the capacitor 218. However, during engine advance spark timing this second trigger pulse is suppressed and the discharging of capacitor 218 is controlled by the first trigger pulse 90 of a subsequently generated waveform. Further, at or below the nominal engine speed as illustrated in FIG. 5 the second trigger pulse 96 from coil 46 occurs slightly after the second trigger pulse 92 from coil 42.

Returning now to the first trigger pulses 90 and 94 presented on lines 1 and 2 of FIG. 5 and assuming for illustrative purposes that the capacitor 218 is not charged, it can be seen that during the first positive trigger pulse 90 the voltage induced at the non-grounded terminal 232 of coil 42 is positive. The trigger pulses emanating from coil 42 are communicated to capacitor 290 through the diodes 242 and 292, and to the gate 252 of the SCR 254 through the diode 242 and resistor 248. These trigger pulses will tend to charge capacitor 290 which will rapidly discharge through resistor 276 and through transistor 280 and will also cause the SCR 254 to become conductive thereby shorting the capacitor 218 to ground. Because of the delays inherent in communicating the trigger pulse to the base 278 of transistor 280 caused by the diode 290, resistor 276 and the base-emitter junction of the transistor 280 the transistor 280 will become conductive after the trigger pulse 90 has been communicated to the gate 252 of the SCR 254. In addition, during this portion of the cycle the voltage induced at the non-grounded terminal 211 of the charge winding or coil 40 is negative and as such the diode 214 blocks the flow of current to the capacitor 218. Consequently, from the above description it can be seen that during first trigger pulse 90 portion of the cycle the act of making the SCR 254 conductive has no appreciable effect on the operation of the system.

The first trigger 94, shown on line 2 on FIG. 5, generated by the suppression coil 46 will cause the transistor 280 to become conductive thereby shorting the gate 252 of the SCR 254 to ground. Since this first trigger pulse 94 from the suppression coil 46, for engine speeds at or below the nominal speed, occurs after the occurrence of the first trigger pulse 90 from the trigger coil 42, the act of shorting the gate 252 of the SCR 254 to ground similarly has no appreciable effect on the operation of the system during this initial portion of the cycle.

During the time the voltage induced in the coil 46 is positive, the capacitor 290 will charge slightly through resistor 276. This voltage will discharge rapidly through the resistor 276 and transistor 280.

As the rotor 14 continues past the stator 12 the voltage induced in the charge coil 40 goes positive, (see line 3, FIG. 5) as indicated by numeral 102 thereby causing the capacitor 218 to charge as indicated on line 4 of FIG. 5. Thereafter, the second trigger pulse 92 is generated in coil 42 which as described above drives the gate 252 of the SCR 254 positively, which in turn drives the SCR 254 into its conductive state thereby shorting the capacitor 218 to ground. This action causes the energy stored in capacitor 218 to be transferred to the primary coils 210, 212 thereby causing the spark plugs 217, 219 to fire. As previously mentioned, the transient portions of the waveforms of FIG. 5 are the result of spark plug firing. The second trigger pulse 96 from coil 46 again turns transistor 280 conductive, however, since the capacitor 218 has been discharged the turning on of transistor 280 has no marked effect on the circuit operation.

The above description described the operation of the system during the normal, low speed, retard ignition spark timing. The prescribed amount of retard timing is achieved by the physical placement of the rotor 14 and the stator in a known manner such that the rotor passes the stator 12 in correspondence with a predetermined number of degrees of ignition timing retard as measured relative to a position such as the top dead center (TDC) position of the pistons within their respective combustion chambers.

The magneto 10 of the present invention generates a unique walking waveform which has been studied in our laboratory. As previously mentioned, it is characteristic of each of the various coils embedded in the stator 12 to produce a waveform having two trigger pulses. Such relationship having previously been discussed with regard to FIG. 5. From the discussion below it will be seen that the phase relation of the second trigger pulse 96 produced by the suppression coil 46 is variable in time relative to the generation of the second trigger pulse 92 produced by the trigger coil 42. It will be shown that the occurrence of the second trigger pulse 96 generated by the suppression coil 46 advances in time with respect to the second pulse 92 generated by the trigger coil 42 as a function of engine speed. This unique behavior is advantageously used to change ignition timing from spark retard to spark advance timing.

Lines 1 and 2 of FIG. 7 illustrate the advanced movement of the second trigger pulse 96 at an increased engine speed such that this second trigger pulse 96 now occurs relatively simultaneously with or slightly before the second trigger pulse 92 of the trigger coil 46. The engine speed at which the second trigger pulse 96 overtakes the trigger pulse 92 is determined by the spacing between the coils 42 and 46. A greater clockwise positioning or spacing between the coils 42 and 46 causes the second trigger pulse 96 to overtake the trigger pulse 92 at a higher rotational engine speed. Similarly, a more counterclockwise positioning or spacing causes the opposite to occur. As will be seen from the discussion below, at this overtaking speed engine spark timing is automatically switched from retard ignition timing to advance ignition timing. The specific overtaking speed is based upon the performance characteristics of the particular engine used. In addition laboratory experiments have shown that the overtaking speed varies approximately one revolution per minute for each one thousandths of an inch (0.0254 mm) spacing between the coils 42 and 46. As such, once the characteristics of the engine and the speed at which advanced spark timing is to begin are determined the required spacings between the coils 42 and 46 may be established thereby permitting spark advance timing to automatically occur at this predetermined engine speed and higher speeds without further engine or system calibration.

In view of the above, the operation of the system in its advance spark timing mode of operation will be discussed. The waveforms on lines 1, 2, 3 and 4 of FIG. 7 illustrate the output voltages produced by coils 40, 42, 46 and the charge on capacitor 218 at the overtaking speed of operation. As the voltage produced by coil 40, (line 3), increases positively the capacitor 218 will become charged as shown on line 4 of FIG. 7. At a predetermined speed of operation the phase of the second trigger pulse 96 will have advanced relative to the generation of the second trigger pulse 92 generated by the trigger coil 42 such that the transistor 280 is made conductive relatively simultaneously with the generation of trigger pulse 92 thereby shorting the gate 252 of the SCR 254 to ground prior to the generation of trigger pulse 92. Upon the generation of the second trigger pulse 92 such positive going waveform will be ineffective to place the SCR 254 in its conductive state because of the effective ground produced by the conduction of the transistor 280. As such, the second trigger pulse 92 is shunted or suppressed. The effect of suppressing the trigger pulse 92 inhibits the transfer of the energy in the capacitor 218 to the ignition coils 66 and 68 to cause a spark under the operation of the second trigger pulse 92 as was the situation during retard timing. However, during the next revolution of the rotor 14 the first trigger pulse 90 (line 1) produced by the trigger coil 42 is effective to control the conductivity of the SCR 254 thereby causing the energy stored in the capacitor 218 to be transferred to the ignition coils 66 and 68 producing a spark in advance of the corresponding engine position when using the second trigger pulse 92.

The suppression of the second trigger pulse 92 generated by the trigger coil 42 is accomplished in a slightly different manner at speeds which are significantly above the overtaking speed. Such suppression does not use the output of the suppression coil to suppress the second trigger pulse 92. As the speed of the engine increases, the second trigger pulse 96 generated by the suppression coil 46 will advance in time so that it is completed before the generation of second trigger pulse 92. As can be appreciated since the second trigger pulse 96 has terminated prior to the initiation of the second trigger pulse 92, the second trigger pulse 96 is ineffective to suppress the later recurring trigger pulse 92. Further, it should be appreciated that at this significantly increased engine speed the trigger pulses (90 and 92) generated by the trigger coil occur relatively close in time. As will be recalled from the discussion above, the trigger pulses 90 and 92 from the trigger coil are effective to charge the capacitor 290. At these increased engine speeds, the second trigger pulse 92 will occur prior to the time that the voltage on the capacitor 290 (generated by the first trigger pulse 90) has dissipated. This voltage is effective to place the transistor 280 in a conductive state and consequently transistor 280 provides an effective short circuit to suppress the second trigger pulse 92 thereby preventing discharge of the capacitor 216 under control of this second trigger pulse 92. The discharging of the capacitor 218 at these increased engine speeds will occur under the control of the next subsequent first trigger pulse 90 in a manner as discussed above.

The circuit 200 further provides means for preventing the reverse rotation of the engine. During such reverse rotation of the engine the rotor 14 passes the stator 12 in a direction opposite to the normal or correct direction of rotation. Since the rotor 14 will pass the winding 46 prior to passing the winding 42 the phase of the trigger pulses generated by coils 46 and 42 are reversed relative to those shown in FIGS. 5 and 7, that is, the trigger pulses produced by winding 46 will first turn the transistor 280 on which suppresses any subsequent pulses generated by winding 42 thereby preventing the triggering of the SCR 254. Since the capacitor 218 cannot be discharged the engine is prevented from running in the incorrect direction.

The following discussion is directed to the operation of the speed limiting portion 208 of the circuit 200. During the first trigger pulse 90 generated by coil 42 the capacitor 330 will be charged. The voltage on capacitor 330 is communicated to the gate 320 of another semiconductor switch such as the SCR 310 through the resistor network comprising resistors 324 and 326 thereby turning SCR 310 conductive. The SCR 310 will remain conductive as long as the voltage communicated thereto is above the threshold value of the SCR 310. The discharging of capacitor 330 is governed primarily by the parallel resistor 332. As previously mentioned during the positive going portion 102 of the voltage waveform generated by the charge coil 40 the capacitor 218 will be charged. In addition, such positive voltage is communicated to the anode 308 of the SCR 310. At low engine speeds the voltage on the capacitor 330 will have discharged prior to the time that a positive going voltage 102 is generated by the charge coil 40. Consequently, at low engine speeds the SCR 310 will remain non-conductive during the generation of the positive voltage portion generated by the coil 40. However, at higher engine speeds the capacitor 330 will not have discharged and consequently the SCR 310 will remain in its conductive state such that upon the generation of the positive voltage signal 102 by coil 40 such voltage signal will be shunted away from capacitor 218 such that capacitor 218 will not be charged and no ignition spark can occur until the engine slows down.

Many changes and modifications in the above described embodiment of the invention can of course be carried out without departing from the scope thereof. Accordingly that scope is intended to be limited only by the scope of the appended claims.

What is claimed is:

1. A capacitive discharge magneto ignition system comprising at least one ignition coil comprising a primary winding and a secondary winding;
   a magneto comprising:
   first means for generating a first induced voltage signal;
   second means for generating a second induced voltage signal having a phase which varies relative to said first induced voltage in proportion to the speed of the engine; and
   third means for generating a third induced voltage of polarity opposite to the polarity of said first induced voltage signal;
   a circuit connecting said magneto to said ignition coil for generating a spark in response to the induced voltages and including a charge capacitor charged by said third means and timing means responsive to the first and second induced voltage signals for advancing the timing of the discharging of said capacitor at a predetermined speed through the ignition coil to provide an ignition spark.

2. The system as defined in claim 1 wherein said timing means includes means for advancing the timing of the ignition spark, at a predetermined level of engine speed, in a step change.

3. A capacitive discharge magneto ignition system comprising at least one ignition coil comprising a primary winding and a secondary winding;

a magneto comprising:
first means for generating a first induced voltage signal;
second means for generating a second induced voltage signal having a phase which varies relative to said first induced voltage in proportion to the speed of the engine; and
third means for generating a third induced voltage of polarity opposite to the polarity of said first induced voltage signal;
a circuit connecting said magneto to said ignition coil for generating a spark in response to the induced voltages and including a charge capacitor charged by said third means and
timing means responsive to the first and second induced voltage signals for advancing the timing of the discharging of said capacitor through the ignition coil to provide an ignition spark;
wherein said magneto further comprises:
an E-type pickup or stator comprising a core including three parallel extending poles terminating at ends;
a rotor comprising permanent magnet means for producing a varying flux field in said stator, when it is periodically moved across said end faces;
said poles defining a first spacing between a second or center pole and a first pole and a second spacing between said center pole and a third pole, said stator positioned relative to said rotor such that said rotor advances from said first pole toward said third pole;
a first or charge coil wound about said center pole;
a second or trigger coil wound about said center pole;
a third or suppression coil wound about a ferromagnetic core positioned in said second spacing remote from said core and electrically isolated, from said trigger coil.

4. The system as defined in claim 3 wherein said poles are asymmetrically spaced.

5. The system as defined in claim 4 wherein said suppression coil is located proximate said end face of said center pole.

6. The system as defined in claim 3 wherein said first means includes said trigger coil, said second means includes said suppression coil and said third means includes said charge coil.

7. The system as defined in claim 6 wherein said first induced voltage waveform includes first and second trigger pulses and said second induced voltage waveform includes first and second trigger pulses.

8. The system as defined in claim 7 wherein said stator and said rotor are positioned such that said second trigger pulse produced by said trigger coil occurs a predetermined number of degrees after a reference position such as the top-dead-center (TDC) position of an associated engine position and wherein said timing means includes first switch means in circuit with said charge coil and said trigger coil and responsive to said first and second trigger pulses from said trigger coil for causing said charge capacitor to discharge the energy stored therein into said ignition coil.

9. The system as defined in claim 8 wherein said charge capacitor is charged by said charge coil immediately prior to the generation of said second trigger pulse from said trigger coil and wherein said second trigger pulse is effective to discharge said charge capacitor to produce said spark.

10. The system as defined in claim 9 wherein said timing means further includes second switch means in circuit with said suppression coil and said first switch means and responsive to said first and second trigger pulses of said suppression coil for shunting said second trigger pulse of said trigger coil away from said first switch means during engine speeds at or above a predeterined nominal engine speed such that said charge capacitor is dishcarged in response to the next first trigger pulse from said trigger coil to effect advance spark timing.

11. The system as defined in claim 10 wherein said first switch means is a first SCR having its gate terminal connected to said trigger coil its anode connected to said charge capacitor and its cathode connected to ground.

12. The system as defined in claim 11 wherein said second switch means is a bipolar transistor.

13. The system as defined in claim 12 wherein said bipolar transistor is of the n-p-n type having its collector connected to said gate terminal of said first SCR, its base terminal in circuit with said suppression coil and its emitter terminal connected to ground.

14. The system as defined in claim 13 wherein said one terminal of said suppression coil is connected to said base terminal through a first diode and wherein said timing means further includes a first capacitor connected substantially in parallel across said suppression coil and said first diode, one terminal of said first capacitor connected to said base terminal through a first resistor, said first capacitor cyclically charged by said trigger coil and cyclically discharged through said first resistor and said transistor.

15. The system as defined in claim 14 wherein at engine speeds substantially in excess of said nominal engine speed said first capacitor is effective to render said transistor conductive during the presence of said second trigger pulse of said trigger coil to shunt said second trigger pulse of said trigger coil away from said first switch means thereby suppressing the discharging of said charge capacitor and preventing the generation of said spark.

16. The system as defined in claim 15 wherein said charge capacitor is discharged in response to the next subsequent first trigger pulse from said trigger coil.

17. The system as defined in claim 6 further including engine speed limiting means comprising:
third switch means connected across said charge coil for shunting, when activated, the output of said charge coil away from said charge capacitor and activation means responsive to the engine speed for activating said third switch means when the engine speed exceeds a maximum desirable level.

18. The system as defined in claim 17 wherein said third switch means comprises a second SCR and a second capacitor communicated to the gate terminal of said second SCR cyclically charged by said trigger coil and discharged through a second resistor connected in parallel across said second capacitor, said capacitor operative to render said second SCR conductive at engine speeds at or above said maximum desireable level to shunt the output of said charge coil away from said charge capacitor.

19. The system as defined in claim 6 wherein when said engine rotates in a direction other than its normal direction said suppression coil generates its trigger pulses in advance of the trigger pulses generated by said trigger coil thereby activating said second switch means to shunt the subsequently generated trigger pulses from said trigger coil away from said first switch means.

20. A capacitive discharge magneto ignition system comprising at least one ignition coil comprising a primary winding and a secondary winding;
a magneto including a stator and a rotor that is rotated synchronously with the engine for inducing voltages into a plurality of windings supported by said stator, said magneto comprising:
first means for generating a first induced voltage signal characterized by a first portion or first trigger pulse of a first polarity and a third portion or second trigger pulses of said first polarity;
second means for generating a second induced voltage signal characterized by a first portion or first trigger pulse of said first polarity followed by a second portion of the opposite polarity and a third portion or second trigger pulse having a phase which varies relative to the second trigger pulse of the first induced voltage signal in proportion to the speed of the engine,
third means for generating a third induced voltage signal of polarity opposite to the polarity of said first induced voltage signal;
a circuit connecting said magneto to said ignition coil for generating a spark in response to the induced voltages; and
including a charge capacitor charged by said third means during periods when the third induced voltage signal is of the first polarity and
timing means responsive to the first and second trigger pulses from the first means and said second means for advancing the timing of the discharging of said capacitor through the ignition coil to provide an ignition spark.

21. The system as defined in claim 20 wherein said magento further comprises:
an E-type pickup or stator comprising a core including three asymetrically positioned parallel extending poles terminating at ends;
a rotor comprising permanent magnet means for producing a varying flux field in said stator,
said poles defining a first spacing between a second or center pole and a first pole and a larger second spacing between said center pole and a third pole, said stator positioned relative to said rotor such that said rotor moves across said stator from said first pole (18) toward said third pole;
a first or charge coil wound about said center pole;
a second or trigger coil wound about said center pole,
a third or suppression coil wound about a ferromagnetic core positioned in said second spacing remote from said core proximate said end face of said center pole and electrically isolated, from said trigger coil.

22. The system as defined in claim 21 wherein said first means includes said triggger coil, said second means includes said suppression coil and said third means includes said charge coil.

23. The system as defined in claim 22 wherein said stator and said rotor are positioned such that said second trigger pulse produced by said trigger coil occurs a predetermined number of degrees after a reference positon such as the top-dead-center (TDC) position of an associated engine positon and
wherein said timing means includes first switch means in circuit with said charge coil and said trigger coil and responsive to said first and second trigger pulses from said trigger coil for causing said charge capacitor to discharge the energy stored therein into said ignition coil.

24. The system as defined in claim 23 wherein said charge capacitor is charged by said charge coil immediately prior to the generation of said second trigger pulse from said trigger coil and wherein said second trigger pulse is effective to discharge said charge capacitor to produce said spark.

25. The system as defined in claim 24 wherein said timing means further includes second switch means in circuit with said suppression coil and said first switch means and responsive to said first and second trigger pulses of said suppression coil for shunting said second trigger pulse of said trigger coil away from said first switch means during engine speeds at or above a predeterined nominal engine speed such that said charge capacitor is discharged in response to the next first trigger pulse from said trigger coil to effect advance spark timing.

26. The system as defined in claim 25 wherein said first switch means is a first SCR having its gate terminal connected to said trigger coil its anode connected to said charge capacitor and its cathode connected to ground.

27. The system as defined in claim 26 wherein said second switch means is a bipolar transistor.

28. The system as defined in claim 27 wherein said bipolar transistor is of the n-p-n type having its collector connected to said gate terminal of said first SCR, its base terminal in circuit with said suppression coil and its emitter terminal connected to ground.

29. The system as defined in claim 28 wherein said one terminal of said suppression coil is connected to said base terminal through a first diode and wherein said timing means further includes a first capacitor connected substantially in parallel across said suppression coil and said first diode, one terminal of said first capacitor connected to said base terminal through a first resistor, said first capacitor cyclically charged by said trigger coil and cyclically discharged through said first resistor and said transistor.

30. The system as defined in claim 29 wherein at engine speeds substantially in excess of said nominal engine speed said first capacitor is effective to render said transistor conductive during the presence of said second trigger pulse of said trigger coil to shunt said second trigger pulse of said trigger coil away from said first switch means thereby suppressing the discharging of said charge capacitor and preventing the generation of said spark.

31. The system as defined in claim 30 wherein said charge capacitor is discharged in response to the next subsequent first trigger pulse from said trigger coil.

32. The system as defined in claim 22 further including engine speed limiting means comprising:
   third switch means connected across said charge coil for shunting, when activated, the output of said charge coil away from said charge capacitor and
   activation means responsive to the engine speed for activating said third switch means when the engine speed exceeds a maximum desirable level.

33. The system as defined in claim 32 wherein said third switch means comprises a second SCR and a second capacitor communicated to the gate terminal of said second SCR cyclically charged by said trigger coil and discharged through a second resistor connected in parallel across said second capacitor, said capacitor operative to render said second SCR conductive at engine speeds at or above said maximum desireable level to shunt the output of said charge coil away from said charge capacitor.

34. The system as defined in claim 25 wherein when said engine rotates in a direction other than its normal direction said suppression coil generates its trigger pulses in advance of the trigger pulses generated by said trigger coil thereby activating said second switch means to shunt the subsequently generated trigger pulses from said trigger coil away from said first switch means.

* * * * *